United States Patent [19]

Episcopo

[11] 4,124,884
[45] Nov. 7, 1978

[54] DC TO DC CONVERTER WITH REGULATED INPUT IMPEDANCE

[75] Inventor: Nicholas P. Episcopo, Wayne, N.J.

[73] Assignee: Bell Telephone Laboratories, Incorporated, Murray Hill, N.J.

[21] Appl. No.: 775,175

[22] Filed: Mar. 7, 1977

[51] Int. Cl.² ............................................ H02M 3/335
[52] U.S. Cl. ........................................ 363/21; 363/97
[58] Field of Search ............ 323/DIG. 1; 363/18–21, 363/41, 97

[56] References Cited

U.S. PATENT DOCUMENTS

| | | | |
|---|---|---|---|
| 3,376,489 | 4/1968 | Crayton | 363/20 |
| 3,514,688 | 5/1970 | Martin | 363/20 X |
| 3,590,361 | 6/1971 | Bishop et al. | 363/21 |
| 3,611,105 | 10/1971 | Sautel et al. | 363/21 |
| 4,005,351 | 1/1977 | Blum | 363/21 X |
| 4,017,782 | 4/1977 | Wheeler | 363/19 |

Primary Examiner—William M. Shoop
Attorney, Agent, or Firm—Alfred G. Steinmetz

[57] ABSTRACT

A converter designed to be powered by a constant current and variable voltage source such as a coaxial cable of variable length includes regulation circuitry to regulate the input voltage of the converter. In particular, the switching device of a single-ended converter is pulse width modulated to regulate the input impedance and hence the input voltage of the converter to permit its efficient operation at varying cable lengths.

14 Claims, 3 Drawing Figures

FIXED INPUT IMPEDANCE

DC TO DC CONVERTER WITH REGULATED INPUT IMPEDANCE

BACKGROUND OF THE INVENTION

1. Field of the Invention

This invention relates to a converter circuit powered by a constant current source. It is particularly concerned with a converter circuit powered by a coaxial cable where the length of the cable may vary considerably. It is specifically concerned with powering the converter circuit with a power source having a constant current but a variable or unstable voltage.

2. Prior Art

Telephone systems many times require the location of a power supply at some remote site. In many instances commercial AC or site located battery power is unavailable at these remote sites. Hence, power must be transmitted to the remote site from a central office location. In some converter applications the power to energize the power supply or converter at the remote site may be supplied by a cable which is coupled to a power source at a distant central office. The length of this cable varies according to the location of the central office with respect to the converter at the remote site. It is not unusual in some instances for the length of a cable from a central office to a remote site to vary from as little as a couple of miles to distances in excess of thirty miles.

Due to the electrical characteristics of coaxial cables, the power supplied through the cable to the converter has the characteristics of a constant current source. Inasmuch as the length of the cable may vary considerably, the voltage at the converter input may vary considerably since the voltage magnitude at the remote end of the cable is a function of the varying cable length. It is not unusual for the voltage applied to the input of a converter at one remote site to vary by as much as a factor of two from the voltage input at another remote site. Due to the relatively wide variations in input voltage it may not be feasible in many instances to use a conventional DC to DC converter source for an application such as described. By way of contrast, most DC to DC converter applications require a converter having a regulated output, whereas the input voltage is assumed to be relatively constant.

Since conventional converters are designed to operate with a relatively constant input voltage, variation of the input voltage from this selected value due to widely varying cable lengths may produce adverse effects on the efficiency and regulation characteristics of a conventional converter.

A typical conventional converter utilized in a remote location and powered by a constant voltage source is shown connected to a coaxial cable in FIG. 1. A cable C of variable length couples a voltage source $V_s$ located at a central office to a DC to DC converter located at some remote site. Since the length of the cable may vary, it is shown to have a variable resistance $R_c$ whose magnitude is a function of the cable length. The circuit arrangement includes a dissipating power resistance $R_p$ utilized to dissipate power due to the higher voltage applied to the converter at the shorter cable lengths.

Due to the operating characteristics of conventional converters as described above, the regulation and efficiency of this converter powering arrangement is poor since, due to variations in the length of the cable in different applications, it is not unusual to have the input voltage vary by a factor of two in different site locations. Because of the instability of the input voltage due to variation in cable length, the converter must be designed to regulate over a wide range of input voltages on the order of a factor of two. Furthermore, at short cable lengths, the increased input voltage places a high voltage stress on the circuit components of the converter.

One solution of the prior art to this variable length cable problem has been to utilize a series dissipation resistance such as the resistance $R_p$ shown in FIG. 1 and, in some instances, shunt regulators are used at the input of the converter. While this arrangement improves the regulation of the converter, it operates to dissipate excess power at shorter cable lengths. This dissipation of power affects efficiency adversely. The shunt regulator must be designed to operate over a wide range of voltages and be capable of dissipating large amounts of power.

SUMMARY OF THE INVENTION

It is therefore an object of this invention to improve the efficiency of converters powered by a variable voltage due to a variable length cable source.

It is a further object to power a converter with a variable voltage source without the necessity to dissipate power at higher voltage inputs.

It is yet another object to reduce the voltage stress on components of converters powered by cable sources of varying cable length.

It is yet another object of the invention to improve the regulation accuracy of a converter powered by a constant current variable voltage source.

Therefore, in accordance with the above objects, a converter embodying the principles of the invention is adapted to be energized by a constant current source having a wide range of voltage such as a coaxial cable. The input voltage supplied to the converter by a coaxial cable is monitored and compared by a comparator with a reference voltage. The comparator output is utilized to control the charging rate of a timing capacitor which establishes the duty cycle of the converter switching device to regulate the converter input voltage by regulating the converter input impedance.

By regulating the input impedance and, hence, the input voltage, the converter may be powered by a cable of varying length where the current is constant but the voltage varies with cable length without adversely affecting the converter efficiency. The added regulation circuit controls the duty cycle of the converter switching device so as to regulate the input impedance of the converter. This presents a constant load to the cable current source and in effect controls the input voltage at some regulated value regardless of the length of the cable.

The following performance equations, which are well known to those skilled in the converter art, define the input and output response of a single-ended converter.

$$V_{in} = \frac{I_{in} R_l \epsilon}{\eta^2} \cdot \left(\frac{T_{off} + T_{on}}{T_{on}}\right)^2 \quad (1)$$

$$V_{out} = \frac{I_{in} R_l \epsilon}{\eta} \cdot \frac{T_{off} + T_{on}}{T_{on}} \quad (2)$$

where
$\epsilon$ = circuit efficiency;
$\eta$ = transformer ratio;

$T_{on}$ = switch conduction time; and
$T_{off}$ = switch nonconduction time.

In a converter which is energized by a constant current source, the input voltage $V_{in}$ and the output voltage $V_{out}$ are determined by the input impedance of the converter. The input impedance is determined by the switching duty cycle. The input impedance of the converter is the controlling factor in contrast to a converter energized by a constant voltage source.

A conventional converter is designed to operate with a relatively constant input voltage. As is apparent from examination of the above equations, both the input and output voltages of a conventional converter are related to the on and off switch conduction time relationship when the input current $I_{in}$ is constant. As can be seen from equation (2), if the load impedance $R_l$ increases, the duty cycle defined by $T_{on}/(T_{on} + T_{off})$, is decreased in a conventional converter in response to a voltage regulation feedback loop in order to regulate the output voltage $V_{out}$. Equation (1) indicates that if the input current $I_{in}$ is constant, the change in the duty cycle in a conventional converter to regulate the output voltage causes the input voltage $V_{in}$ to increase proportionally to the increase in the load $R_l$. A conventional converter, powered by a constant input current, responds to a reduction in duty cycle with an increase in input voltage $V_{in}$. Changes occurring in the input and output voltages in response to the regulation circuitry of a conventional converter are exactly opposite to the changes needed to effect regulation of the output voltage.

The converter described herein and which embodies the principles of the invention controls the duty cycle to regulate the input impedance. Since the power source is a constant current, the input voltage is likewise regulated. Hence, the converter may operate efficiently without excess power dissipation regardless of the length of the cable from which it receives its input power.

The regulation of the signal output of the converter applied to a subsequent load may be refined by the use of a shunt regulator connected at the converter output. Inasmuch as the input impedance of the converter is regulated, the power source represented by the cable is not affected by the impedance of the shunt regulators or the load but only by the constant input impedance of the converter.

DETAILED DESCRIPTION

Figure 1:
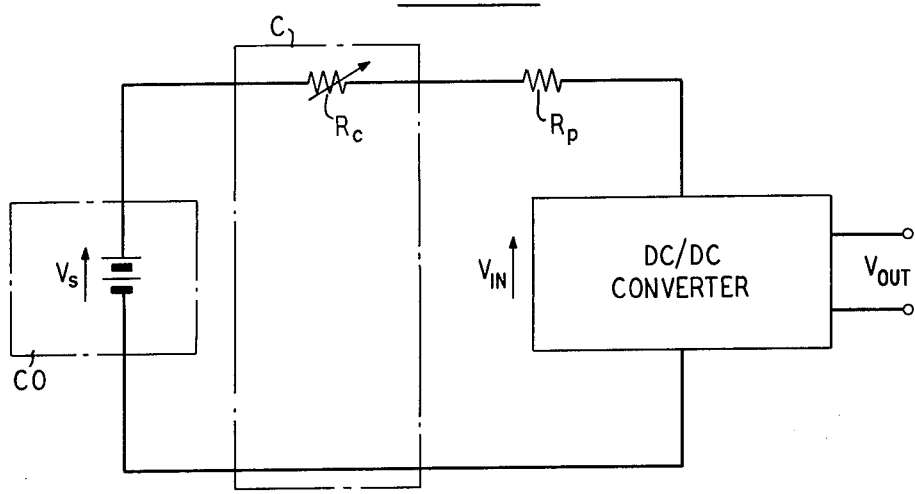
FIG. 1 is a schematic and block diagram of a conventional converter connected to a variable length cable according to the prior art discussed above.
Figure 2:
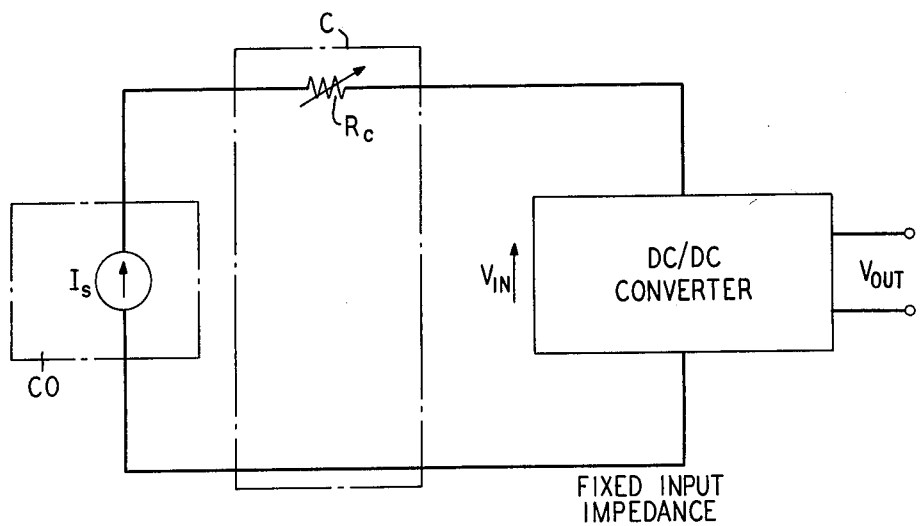
FIG. 2 is a schematic and block diagram of a converter embodying principles of operation according to the invention connected to a variable length cable.

FIG. 2 shows a DC to DC converter operating in accordance with the principles of the invention. The converter is designed to be powered by a constant current source and therefore has a regulated input impedance to obtain a regulated input voltage. This converter is connected to a variable length cable C which acts as a constant current power source supplying a constant current $I_s$ to the input of the DC to DC converter. The variable impedance $R_c$ is illustrative of the varying impedance of the cable due to the varying length of the cable. Inasmuch as the converter has a regulated input impedance, the input voltage is constrained to be a constant voltage thereby improving the efficiency and the regulation accuracy of the converter.

Figure 3:
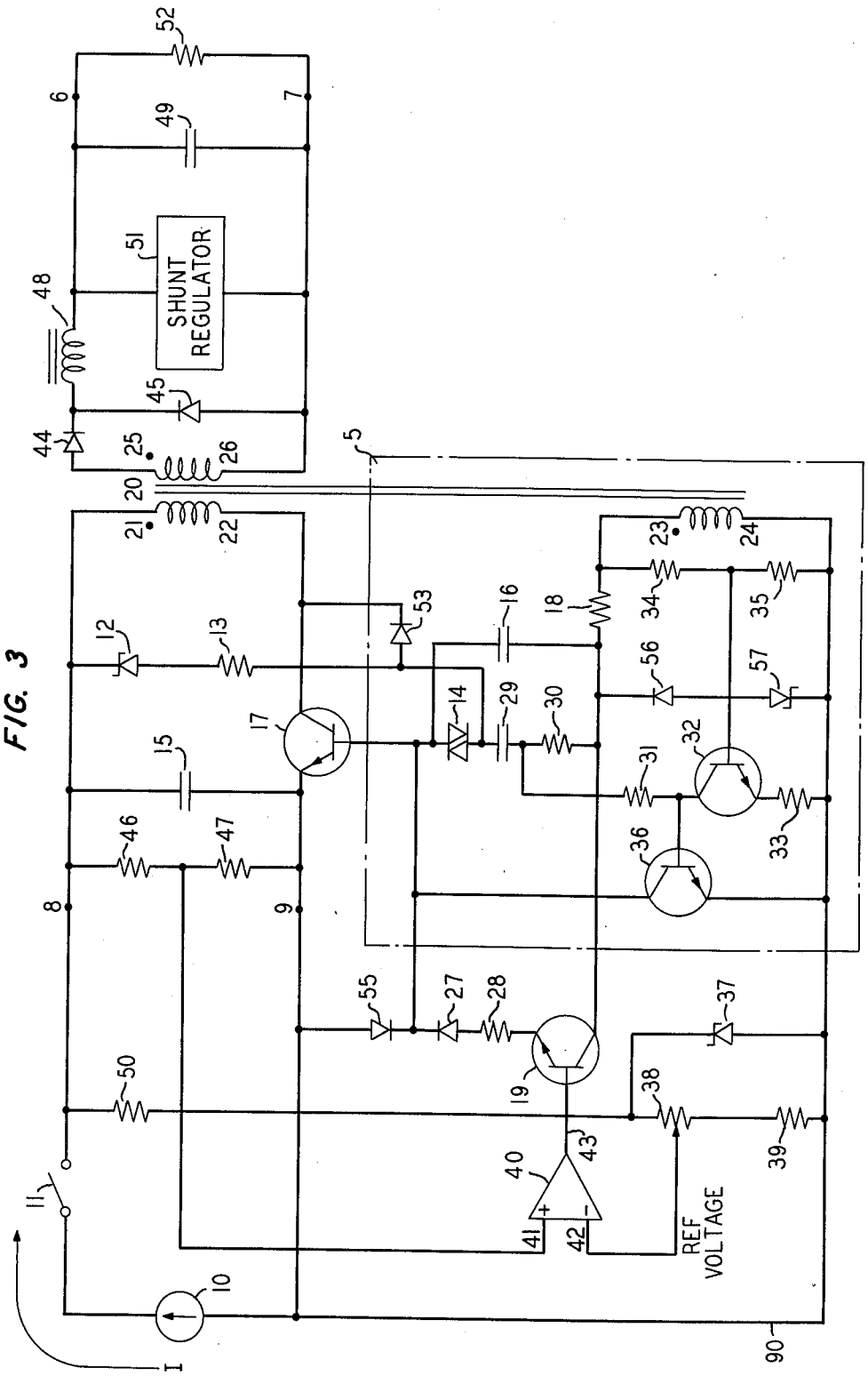
FIG. 3 is a schematic of a DC to DC converter designed to be powered by a variable length cable and which embodies the principles of the invention.

A schematic of a converter embodying the principles of the invention is shown in FIG. 3 where the cable power source is represented by the constant current source 10. The current source 10 is assumed to have a wide range of voltages as would be the case with coaxial cables of different lengths. This constant current is applied to the input terminals 8 and 9 of the converter when the single-pole switch 11 is closed. The DC to DC converter disclosed herein is a single-ended converter comprising a transformer 20 including a primary winding 21-22, a feedback winding 23-24, and a secondary winding 25-26. Output terminals 6 and 7 couple the secondary windings 25-26 to a load 52.

The application of voltage to the primary winding is controlled by a switching transistor 17. As is explained hereinbelow, the duty cycle of the switching transistor 17 is controlled to maintain the input voltage applied to the converter at a predetermined regulated value regardless of the cable length. A comparator amplifier 40 compares a portion of the input voltage with a predetermined reference voltage and generates control signals to control the duty cycle of the switching transistor 17 in order to regulate the impedance and hence the input voltage to the converter. The invention may best be understood by describing the operation of this DC to DC converter.

The operation of the converter starts when the constant current source 10 is applied to its input by closing the single-pole switch 11. The converter is designed so that the minimum expected input voltage at the predicted longest cable length is sufficient to initiate oscillation in the converter. An input current charges a capacitor 15 connected across the input terminals 8 and 9. Voltage across this capacitor eventually reaches a level sufficient to break down a zener diode 12 and varistor 14. When these components break down, a capacitor 16 is charged by current flowing through a path comprising zener diode 12, resistor 13, and the varistor 14. The upper plate of the capacitor 16 accumulates positive charge and eventually reaches a level sufficient to forward bias switching transistor 17. Switching transistor 17 begins conduction, its collector voltage decreases, and the voltage stored on capacitor 15 is applied across a primary winding 21-22 of the converter transformer 20. At this point self-oscillation is sustained by feedback circuitry contained within the area defined by dotted line 5 and described below.

The voltage level across the primary winding 21-22 is magnetically coupled to the feedback winding 23-24. This induces regenerative action to begin to drive the switching transistor 17 towards saturation. Voltage developed across the winding 23-24 applies a regenerative base drive signal via resistor 18, transistor 19, diode 27, and resistor 28 to the base of the switching transistor 17. This voltage across the feedback winding 23-24 quickly reaches its square wave peak voltage. Charge is accumulated on the capacitor 29 during this time period and operates to keep the transistor 17 forward biased. Capacitor 29 is charged by feedback winding 23-24 through resistor 18, resistor 30, and varistor 14. This circuit has a substantially longer time constant as compared to the time constant of the previously described RC circuit comprising resistor 18 and capacitor 16.

By the time the square wave peak voltage is reached by the winding 23-24, the switching transistor 17 has been driven to the edge of its saturation region. Diode 53 operates to prevent transistor 17 from going deep into saturation. The positive voltage at the junction of capacitor 29 and resistor 30 is increasing exponentially. Current flowing through resistor 31, transistor 32, and resistor 33, in response to this positive voltage, is also increasing exponentially. Transistor 32 is biased by a bias voltage generated at the junction of resistors 34 and 35 which are connected in series and shunt feedback winding 23-24. The bias is operative to limit the maximum current flow through the collector-emitter path of transistor 32. After this predetermined maximum current flow is attained, transistor 32 operates as a constant current sink. However, the positive voltage continues to increase and the current supplied continues to increase. The excess current beyond the predetermined maximum current flowing through transistor 32 flows into the base of transistor 36 and biases it conducting.

With transistor 32 conducting at its maximum value, excess current in the series path is applied to the base of transistor 36. This current is multiplied by the transistor 36 and results in a collector current which diverts current from the base of the switching transistor 17. This initiates the turn-off of the switching transistor 17. As conduction in transistor 17 decreases, the stored energy in primary winding 21-22 generates a reverse voltage which is coupled to feedback winding 23-24. The regenerative action now rapidly turns switching transistor 17 off. Once transistor 17 turns off, the reverse voltage generated in winding 23-24 quickly biases transistor 36 nonconducting and causes a current to flow through diode 55 via lead 90. This current backbiases transistor 17 and continues to flow through the diode 55 in response to the ringing effect of the series circuit including the magnetizing inductance of winding 23-24, capacitor 29, and resistor 30. This ringing effect, which maintains transistor 17 nonconducting, continues until the magnetization of the core of transformer 20 is reset to zero.

As can be seen from the foregoing description, the base drive circuit of the switching transistor 17 comprises two separate timing circuits. The first circuit is a series RC circuit comprising resistor 18, resistor 30, and capacitor 29 which control the conduction time. The second circuit is a series LCR circuit comprising resistor 18, resistor 30, capacitor 29, and the magnetizing inductance of winding 23-24. These circuits control the frequency of oscillation of the converter. It will be apparent to those skilled in the art that the utilization of transistor 36 to turn off the switching transistor 17 permits control of the conduction time of transistor 17 independent of $\beta$ variations in the transistor 17.

As described hereinabove, the modulated conduction interval or duty cycle of switching transistor 17 is controlled in order to regulate the input impedance and, hence, with a constant current source, the input voltage applied to the converter circuit. This duty cycle control is effected by controlling the charging rate of the timing capacitor 29 in the base drive circuit of the switching transistor 17. Primary control of this charging rate is provided by the transistor 19 which is responsive to the output of a comparator amplifier 40.

Input voltage to the converter is monitored by a comparator amplifier 40. A voltage divider comprising resistors 46 and 47 is connected to sense the input voltage. A portion of this voltage at the junction of resistors 46 and 47 is applied to an input 41 of the comparator amplifier 40. A reference voltage is applied to the other input 42 of the comparator amplifier 40. This reference voltage is derived from the input voltage by a voltage divider comprising resistors 50, 38, and 39. A zener diode 37 shunts the resistors 38 and 39 and a portion of this constant voltage is selected by a wiper arm connected to resistor 38 and is applied to input 42 of the comparator amplifier.

An error voltage proportional to the deviation of the input voltage from its regulated value is generated at the output 43 of comparator amplifier 40. This error voltage is applied to the base of transistor 19. Transistor 19 responds to the error voltage output and controls the timing of the base drive for switching transistor 17 in order to regulate the converter input voltage. The control of this timing is accomplished by essentially applying a variable clamp voltage across the series connection of the resistor 30, timing capacitor 29 and the varistor 14. The magnitude of this clamp voltage controls the charging rate of the timing capacitor 29. For example, if the input voltage to the converter begins to increase, the square wave peak voltage appearing across the winding 23-24 will increase proportionally. In a conventional converter this would cause the timing capacitor 29 to charge at a faster rate and, in turn, cause the transistor 36 to conduct sooner thereby shortening the conduction time of switching transistor 17. As is apparent from examination of the above-described equation (2), when the conduction time $T_{on}$ decreases with respect to the period, the input voltage rises in response to a constant current source. This increase regeneratively adds via the base drive of a conventional converter to the initial input voltage increase.

The error voltage generated by the comparator amplifier 40 is utilized to counter this regenerative effect. In the instant example the error voltage generated by the comparator amplifier 40 operates to increase the conduction interval of transistor 19 with respect to the period. The decreased impedance of transistor 19 in turn decreases the charging current applied to the timing capacitor 29 and counters the effect of the initial input voltage increase. As is apparent from the described example, the error output of the comparator amplifier 40 operates to control the conduction level of transistor 19. This in turn controls the charging current applied to the timing circuit comprising varistor 14, timing capacitor 29, and resistor 30 in order to regulate the input voltage applied to the converter by controlling the duty cycle of the switching transistor 17. As is apparent from the foregoing, the input voltage regulation of the converter will also respond to counter a decrease in the input voltage of the converter by decreasing the conduction interval or duty cycle of the switching transistor 17.

The voltage generated across the secondary winding 25-26 is a square wave voltage and is rectified by the two rectifying diodes 44 and 45. The rectified voltage is applied to a filter inductor 48 and a capacitor 49. Inasmuch as voltage variations may occur due to load variations, a shunt regulator is connected across the output terminals. This shunt regulator functions as a constant load to the converter output and precisely regulates the voltage output. This output voltage regulation function of the shunt regulator contributes positively to the regulation of the input voltage and assures a constant output voltage at the load 52.

It is readily apparent from the foregoing that by regulating the input voltage of the converter very high efficiencies may be attained despite wide variations in the length of the cable powering the converter. Many other applications of this invention will be readily apparent to those skilled in the art without departing from the spirit and scope of the invention, and it is not believed necessary to describe these variations in detail.

What is claimed is:

1. A power supply energized by a current source having an unstable voltage characteristic comprising:
   input means for accepting a current source,
   output means,
   switching means for modulating a signal coupling said input means to said output means, and
   sensing means for responding to a voltage magnitude coupled to said input means,
   reference means for accepting a reference voltage,
   comparator means coupled to respond to outputs of said sensing means and said reference means to generate a signal output as a function thereof,
   driving means coupled to be responsive to the signal output of said comparator means and operatively coupled to control a duty cycle of said switching means,
   said driving means including:
   a timing circuit means and a charging rate control means for controlling the rate of charging of said timing circuit means, said charging rate control means coupled to and responsive to the signal output of said comparator means,
   whereby a voltage magnitude at said input means is regulated.

2. A power supply as defined in claim 1 further including regenerative feedback means coupled to supply charge to said timing circuit means and said charging rate control means comprising a variable impedance clamp means connected in shunt with said timing circuit means.

3. A DC to DC converter including:
   input means for accepting a source of current,
   output means,
   switching means coupling said input means and output means, means for driving said switching means and including a timing capacitor coupled to a driving input of said switching means,
   sensing means coupled to monitor a voltage magnitude at said input means, reference voltage terminal means for accepting a reference voltage, comparator means coupled for comparing a voltage of said sensing means and a voltage at said reference voltage terminal means and generating an error voltage output responsive thereto,
   charging control means coupled to said timing capacitor for controlling the charging rate thereof, said charging control means connected to the error voltage output of said comparator means and responsive thereto, whereby a duty cycle of said switching means is controlled for regulating a voltage at said input means.

4. A DC to DC converter as defined in claim 3 wherein said charging control means includes a circuit path including a controllably variable impedance device, said circuit path connected to shunt said timing capacitor and said controllably variable impedance coupled to the error voltage output of said comparator means and responsive thereto.

5. A DC to DC converter as defined in claim 4 wherein said means for driving comprises a transformer including a regenerative feedback winding coupled to supply charging current to said timing capacitor, and a starting circuit to initiate oscillation in said converter including a charge storage capacitor and a breakdown device responsive to a charge threshold on said charge storage capacitor and coupled to a driving input of said switching means.

6. A converter circuit comprising:
   input means to accept a current source,
   a power transformer, including a primary winding and a feedback winding, switching means connected to couple said input means to said primary winding,
   switch drive means coupled to drive said switching means and responsive to said feedback winding, said switching drive means including timing circuit means to control conduction intervals in said switching means,
   comparator means having first and second input terminals,
   sensing means coupled to sense a voltage magnitude at said input means and further coupled to apply a proportional voltage derived therefrom to the first input terminal of said comparator means,
   a reference terminal means to accept a reference voltage and coupled to apply a reference voltage to the second input terminal of said comparator means,
   said switch drive means further including charge control means coupled to said timing circuit to control a charging rate therein to controllably modify a conduction interval of said switching device,
   said charge control means responsive to an error signal output of said comparator means, whereby said conduction interval is controllably modified to regulate a voltage at said input means.

7. A converter as defined in claim 6 wherein said timing circuit includes a timing capacitor coupled to be charged by said feedback winding and wherein said charge control means includes a variable impedance coupled to be controlled by said comparator means, said charge control means being connected to shunt said timing circuit whereby the level of charging current applied to said timing capacitor is controlled in response to said comparator means.

8. A converter as defined in claim 7 wherein said switch drive means comprises capacitive charge accumulation means coupled to said input means and voltage threshold responsive means coupled to said capacitive charge accumulation means and operative to initiate oscillatory action in said converter circuit.

9. A converter as defined in claim 8 wherein said power transformer includes a secondary winding and output means to interconnect said secondary winding to a load, said output means including rectifying means and a shunt regulator.

10. A DC to DC converter comprising:
    a power transformer including a primary winding, a secondary winding, and a feedback winding,
    first and second input terminals,
    a switching transistor connecting one of said first and second input terminals to said primary winding, a base drive circuit connected to a base electrode of said switching transistor and coupled to be operative in response to said feedback winding, said base drive circuit comprising a timing circuit including a timing capacitor and a charging path coupled to said feedback winding, a voltage sensing circuit connected across said first and second input terminals, a third terminal to accept a reference voltage, a voltage comparison circuit having a first input connected to said voltage sensing circuit and a second input connected to said third terminal, respectively, a clamp circuit having a controllable variable impedance and connected in parallel with said timing circuit and operative to control the rate of charging of said timing capacitor, said variable impedance coupled to be responsive to said voltage comparison circuit whereby said base drive circuit controls conductive intervals of said switching transistor so as to regulate a voltage across said first and second input terminals.

11. A DC to DC converter as defined in claim 10 further including rectifier means coupled to said secondary winding and a shunt regulator coupled to an output of said rectifier means.

12. A DC to DC converter as defined in claim 10 further including starting circuit means to initiate oscillatory action in said converter, said starting circuit comprising a charge storage capacitor connected across said first and second input terminals and a start circuit path coupling said charge storage capacitor to said base electrode, said start circuit path including a threshold responsive breakdown device.

13. A DC to DC converter as defined in claim 10 wherein said controllable variable impedance comprises a linearly biased transistor having its control electrode connected to an output of said voltage comparison circuit.

14. A DC to DC converter as defined in claim 12 wherein said starting circuit includes a second storage capacitor and an impedance to control the charging rate therein, said second stroage capacitor being connected to said base electrode.

* * * * *